Figure 1:
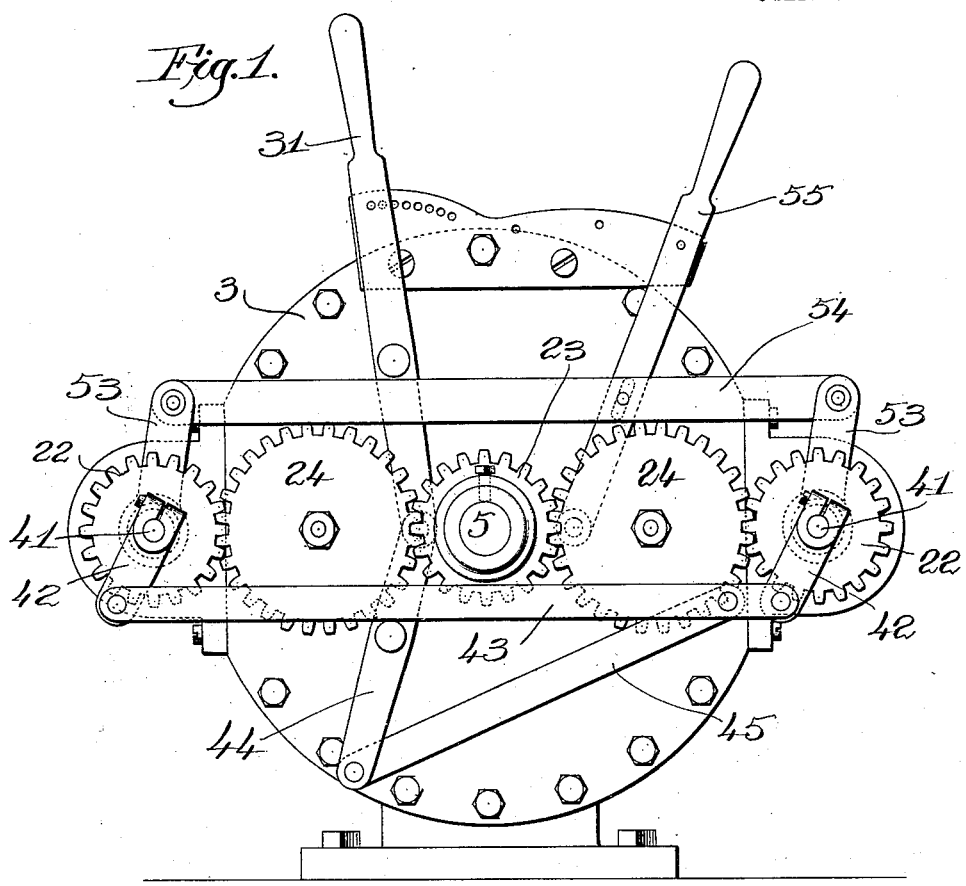

No. 891,839. PATENTED JUNE 30, 1908.
G. T. KILLAM & M. O'NEILL.
ROTARY ENGINE.
APPLICATION FILED NOV. 16, 1906.

3 SHEETS—SHEET 1.

Witnesses.
Thomas J. Drummond.
Joseph M. Ward.

Inventors.
George T. Killam
Murray O'Neill,
by Bradley Gregory attys.

No. 891,839. PATENTED JUNE 30, 1908.
G. T. KILLAM & M. O'NEILL.
ROTARY ENGINE.
APPLICATION FILED NOV. 16, 1906.

3 SHEETS—SHEET 2.

Witnesses.
Thomas J. Drummond.
Joseph M. Ward.

Inventors.
George T. Killam
Murray O'Neill,
by Dusby Gregory Attys.

No. 891,839. PATENTED JUNE 30, 1908.
G. T. KILLAM & M. O'NEILL.
ROTARY ENGINE.
APPLICATION FILED NOV. 16, 1906.
3 SHEETS—SHEET 3.
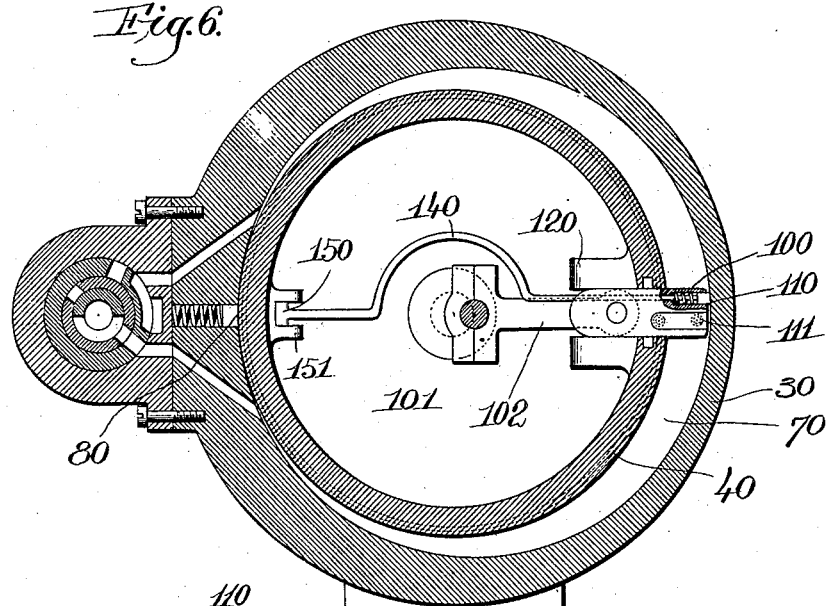
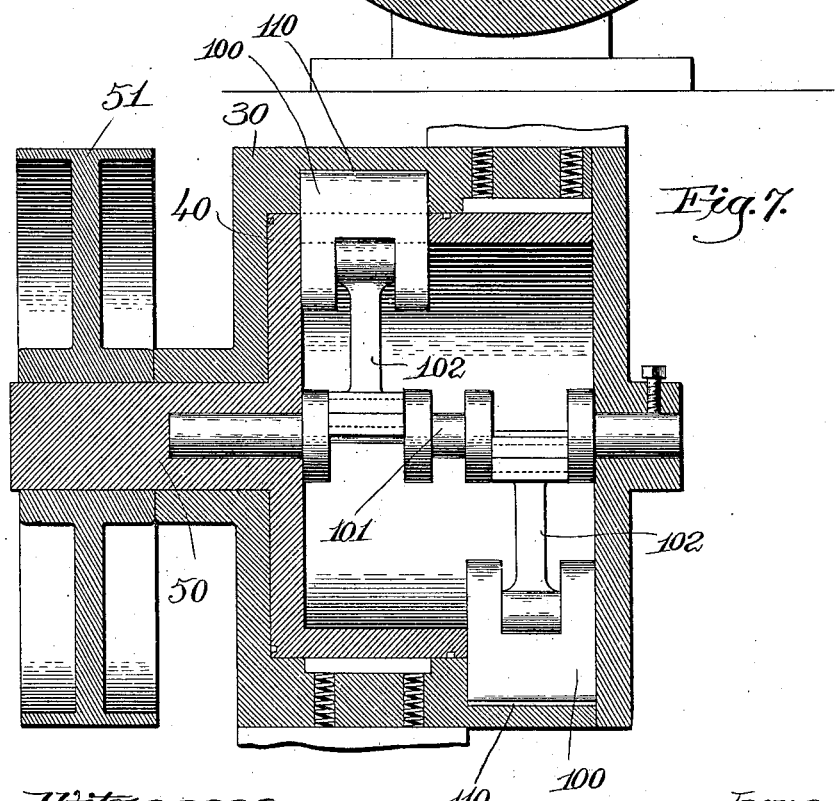
Witnesses:
Thomas Drummond.
Joseph M. Ward.
Inventors.
George T. Killam
Murray O'Neill.
by Crosley Gregory
attys.

UNITED STATES PATENT OFFICE.

GEORGE T. KILLAM AND MURRAY O'NEILL, OF EVERETT, MASSACHUSETTS.

ROTARY ENGINE.

No. 891,839.  Specification of Letters Patent.  Patented June 30, 1908.

Application filed November 16, 1906. Serial No. 343,660.

*To all whom it may concern:*

Be it known that we, GEORGE T. KILLAM and MURRAY O'NEILL, citizens of the United States, residing at Everett, county of Middlesex, and State of Massachusetts, have invented an Improvement in Rotary Engines, of which the following description, in connection with the accompanying drawing, is a specification, like letters on the drawing representing like parts.

This invention relates to rotary engines, and has for its object to provide a novel engine comprising the features hereinafter described and claimed.

Figure 4:
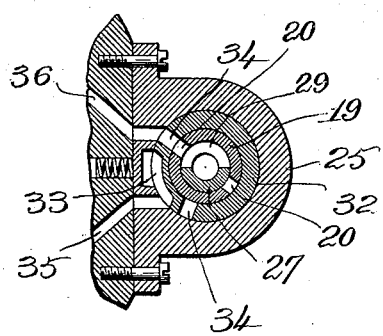
Figure 5:
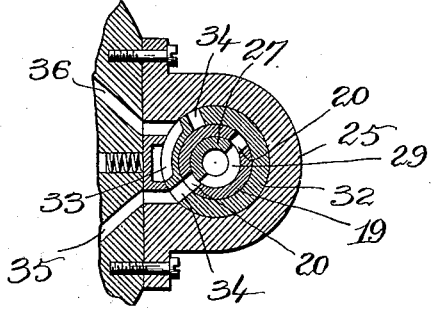
Figure 2:
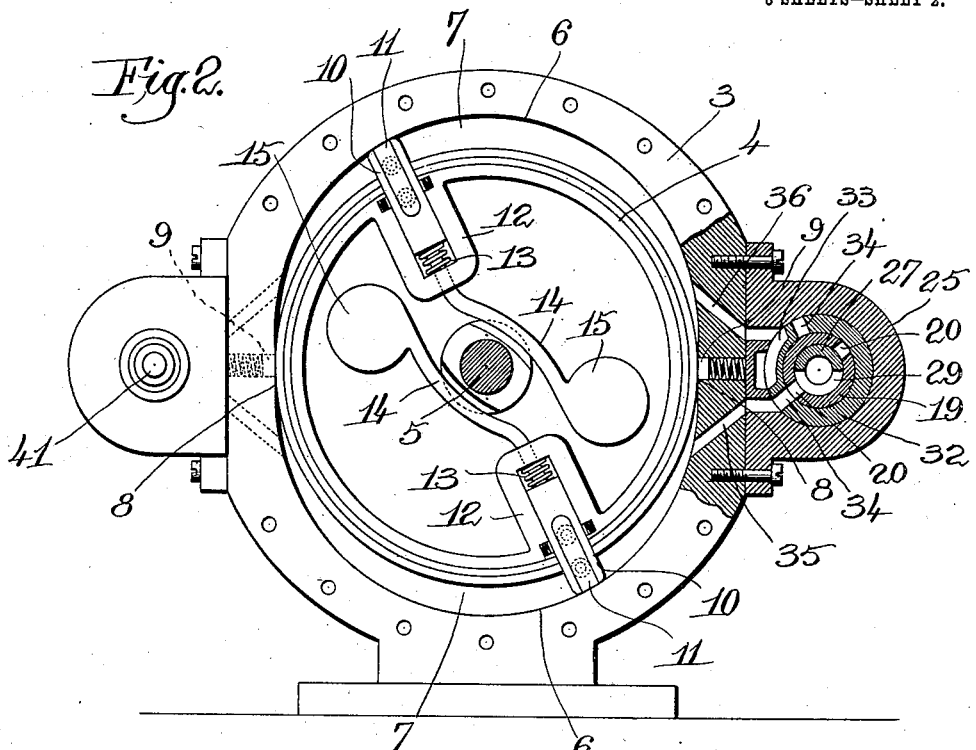
Figure 3:
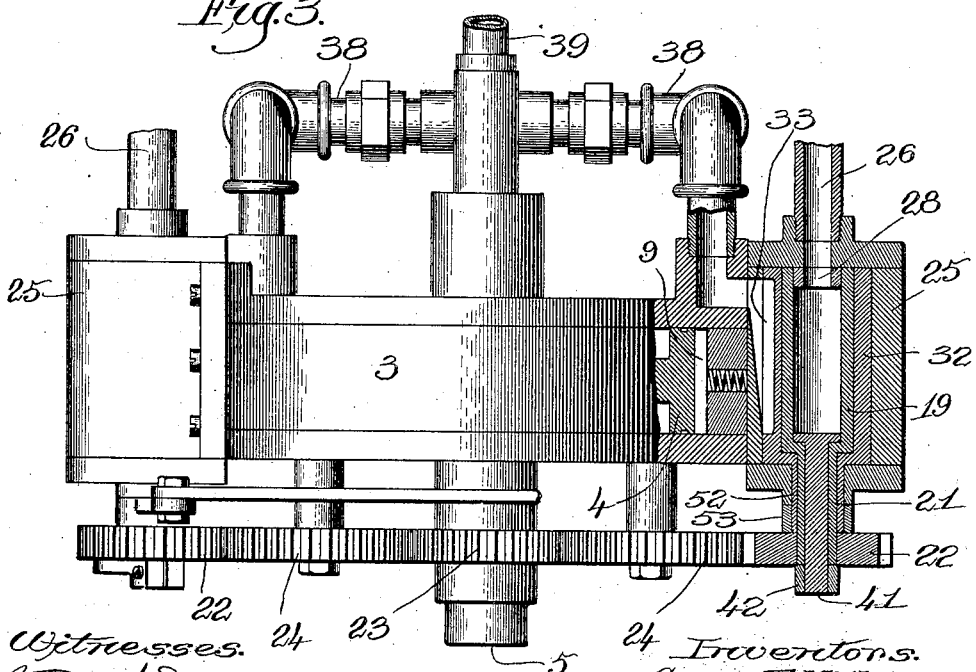

In the drawings wherein we have illustrated two embodiments of our invention, Figure 1 is a side view of an engine; Fig. 2 is a central vertical section through Fig. 1; Fig. 3 is a top plan view of Fig. 1 with one valve shown in section; Figs. 4 and 5 are sections through the valve showing elements thereof in different positions; Fig. 6 is a vertical section through an engine showing another embodiment of our invention; Fig. 7 is a vertical central section through Fig. 6.

Referring first to Figs. 1 to 5, wherein a single cylinder engine is shown, 3 designates the casing within which is situated the rotor 4 that is fixed to the driving shaft 5 of the engine. The rotor 4 is cylindrical in shape, and is preferably hollow, it being in the form of a cylindrical shell.

In the embodiment of the invention shown in Figs. 1, 2 and 3, the engine is a double-acting one, that is, it takes steam twice during each rotation of the rotor 4, and for this purpose, the interior of the shell 3 is provided with the two eccentric portions 6 which form with the rotor 4 two crescent-shaped chambers 7 that have the functions of cylinders of a steam engine. The rotor 4 engages the inner periphery of the casing 3 at two diametrically opposite points 8, and at these points, a spring-pressed follower or packing 9 is employed to make a steam-tight joint. The rotor 4 carries two piston-blades 10, and each is preferably provided with a spring-pressed packing member 11. The piston-blades 10 are mounted to slide radially in the rotor, and for this purpose, the rotor is provided with the guides 12. Said piston-blades are normally thrown outward by means of suitable springs 13 which are just strong enough to keep the piston-blades in contact with the inner wall of the casing 3. When the engine is rotating, the centrifugal force of the piston-blades 10 tends to throw them outwardly against the inner wall of the casing 3, and unless the action of this centrifugal force is counterbalanced, the friction produced between the piston-blades 10 and the casing 3 when the engine is rotating rapidly would be such as to materially reduce the efficiency of the engine. In order to thus counterbalance this centrifugal force and prevent the creation of any undue friction between the piston-blades and the casing, we have counterweighted said piston-blades in such a way that the centrifugal force on the counterweight will balance that on the piston, and thus the only force which comes into play to hold the piston-blades against the casing is that generated by the springs 13, and this force is constant, regardless of the speed of rotation.

In the embodiment of the invention shown in Fig. 2, the piston-blades 10 are counterweighted by extending inwardly from each a stem 14 which carries at its inner end a counterweight 15, the counterweight being of such a size that the centrifugal force thereon will counterbalance that on the piston-blades 10.

As stated above, in the embodiment of the invention shown in Figs. 2 and 3, the valve arrangement of the engine is constructed to admit steam to the engine twice during each revolution.

In Figs. 5 and 6, we have illustrated an embodiment of the invention in which steam is admitted once only to each cylinder during each revolution. In this embodiment of the invention, 30 designates the casing and 40 the rotor within the casing. The casing is provided with the cylindrical chamber 70 within which the rotor which is also cylindrical is situated, but the rotor is arranged eccentrically in the chamber, as seen best in Fig. 6, with one side thereof touching the interior wall 70, as at 80. The rotor is connected to the driving shaft 50 on which the driving pulley 51 is mounted. This rotor is preferably hollow, and it carries a piston-blade 100 which extends through the periphery of the rotor and is slidably mounted therein, it being guided by suitable guides 120. In this embodiment of our invention, the piston-blade 100 is secured to a stationary crank shaft 101 so that as the rotor rotates, the piston-blade is moved out and in by eccentricity of the crank-shaft 101, and thus it is caused to follow the inner wall of the cylinder or chamber 70. The piston-blade 100 slides out and in radially and is connected to the crank-pin by a link 102. The arrangement is such that the piston-blade 10 itself does not actually contact with the inner wall of the chamber 70, and in order to prevent the leakage of steam past the piston-blade, it is provided with the steam-check or packing member 110 which is contained within a recess in the piston-blade, and is acted upon by a suitable spring 111 which tends to throw it outwardly. Even though this steam-check or packing is comparatively small, yet where the engine is rotating rapidly, the centrifugal force thereof is sufficient to create a decided friction between said packing and the casing 30, and to obviate this, we have provided for counterbalancing this packing member so that whatever speed the engine rotates, there will be a force opposing the centrifugal force on the packing member, which opposing force is sufficient to entirely neutralize the centrifugal force.

In the present embodiment of our invention, we accomplish this by connecting the packing member 110 with a counterweight 150 by means of a suitable connection 140, the counterweight being situated on the opposite side of the rotor from the piston, and being guided in suitable guides 151. The counterweight is of such a size that the centrifugal force thereon just balances that on the packing member 110, and therefore at whatever speed the engine operates, the centrifugal force on the packing member 110 will be equalized, and it will be held against the wall of the chamber 70 solely by the action of the spring 111. Where the steam is admitted once during each rotation, we prefer to employ two cylinders, the pistons of which are oppositely disposed, as shown in Fig. 7, so that the weight on the shaft 50 will be neutralized at all points, and the mechanism will be balanced. Where two or more cylinders are employed, the valves will be situated properly to admit the steam or other motive fluid to each cylinder at the proper time.

The valve mechanism is of such a character that the engine may be reversed and the admission of steam may be cut off at any part of the stroke.

In the embodiment of the invention shown in Figs. 2 and 3, two valve mechanisms are employed, one on each side of the cylinder or casing 3 and each adapted to admit steam to the engine and exhaust it at the proper time. A description of one of these valves will suffice for both, as both are alike.

In the present embodiment of our invention, we have provided a main steam valve 19 in the shape of a cylinder having one or more discharge ports 20 in its periphery and have connected said steam valve with the main shaft 5 so as to cause it to rotate in unison with the main shaft. For this purpose, the valve 19 has a stem 21 to which is attached a gear 22 that is driven from a gear 23 carried by the main shaft 5. The steam valve shown in Figs. 2 and 3 is arranged to admit steam twice during each revolution, and the gearing for rotating said valve is, therefore, arranged to rotate the valve once for each rotation of the main shaft. As herein shown, the gear 23 meshes with and drives an intermediate gear 24 which in turn meshes with and drives the gear 22. The valve 19 is contained within a valve casing 25, and steam is admitted to the end of the valve through the pipe 26. Situated within the valve 19 is a hollow cylindrical cut-off valve 27 which is open at one end, as at 28, to admit the steam to the interior thereof. Said cut-off valve 27 has the port 29 in the periphery thereof, and by turning it about its axis, as shown in Fig. 5, the steam may be cut off from the cylinder at any desired point. The cut-off valve is manually controlled and may be set in any adjusted position. For this purpose, we have provided the adjusting lever 31 which is connected to both cut-off valves so that they are adjusted simultaneously. Each cut-off valve is provided with a stem or hub 41 to which is fastened an arm 42, the two arms being connected by a link 43, see Fig. 1. The lever 31 is shown as pivoted to another centrally-pivoted lever 44, and the latter is connected to the link 43 by means of a connection 45. With this construction, both cut-off valves may be simultaneously adjusted by the movement of the lever 31. Any other suitable means for adjusting the cut-off valve may be adopted, however, without departing from our invention.

Surrounding each steam valve 19 is a reversing valve 32 which is also a hollow cylindrical valve and is provided with the exhaust port 33 and with the steam ports 34. 35 and 36 designate ports which lead into the chambers 7. The reversing valve is also arranged to be manually adjusted for reversing the engine. The two reversing valves are also preferably connected for simultaneous operation, and for this purpose, each has extending therefrom a neck 52 from which extends an arm 53, and the two arms are connected by a link or connection 54, see Fig. 1, to which is pivotally connected the operating lever 55.

When the valves are in the position shown in Fig. 2, steam enters the valve through the end thereof, and when during the rotation of the steam valve 19 one of the ports 20 thereof comes in line with the port 34 of the reversing valve, steam will be admitted through said ports, and the port 35 into the chamber 7 behind the piston-blade 10, and at the same time, the steam in front of the piston-blade 10 will be exhausted through the port 36 and exhaust port 33. The exhaust ports 33 of both valves are connected to an exhaust pipe 39 by means of pipes 38. For reversing the engine, the reversing valve is shifted into the position shown in Fig. 4 to bring the other port 34 therein into line with the port 36 and the exhaust port 33 into line with the port 35. The reversing valve and steam valve can be moved independently from each other, and the reversing of the engine requires merely a shifting of the lever 55.

In the embodiment of the invention shown in Fig. 2, both valves admit steam to the same casing, but where two separate cylinders are employed, as shown in Figs. 6 and 7, one valve will admit to one cylinder and the other valve to the other cylinder.

While we have illustrated two embodiments of our invention, we do not wish to be limited to the constructional details shown, nor in any way except by the appended claims.

Having fully described our invention, what we claim as new and desire to secure by Letters Patent is:—

1. In a rotary engine, a cylinder, a rotor therein, a piston-blade carried by the rotor to move radially, a packing member carried by the piston-blade to engage the inner wall of the cylinder, and means to counterbalance the centrifugal force of the packing member.

2. In a rotary engine, a cylinder, a rotor therein, a piston-blade carried by the rotor to move radially, a packing member carried by the piston-blade to engage the inner wall of the cylinder, and a counterweight secured to the packing member and adapted to counterbalance the centrifugal force thereof.

3. In a rotary engine, a casing, a rotor therein, said casing having two oppositely-disposed cylinders, two piston-blades carried by the rotor one operating in each cylinder, and a stationary crank shaft to which both piston-blades are connected.

4. In a rotary engine, a casing, a rotor therein, said casing having two oppositely-disposed cylinders, two piston-blades carried by the rotor one operating in each cylinder, a stationary crank shaft to which both piston-blades are connected, a packing member carried by each piston-blade, and a counterweight secured to each packing member and adapted to counterbalance the centrifugal force thereof.

In testimony whereof, we have signed our names to this specification, in the presence of two subscribing witnesses.

GEORGE T. KILLAM.
MURRAY O'NEILL.

Witnesses:
LOUIS C. SMITH,
BERTHA F. HEUSER.